United States Patent Office 2,784,700
Patented Mar. 12, 1957

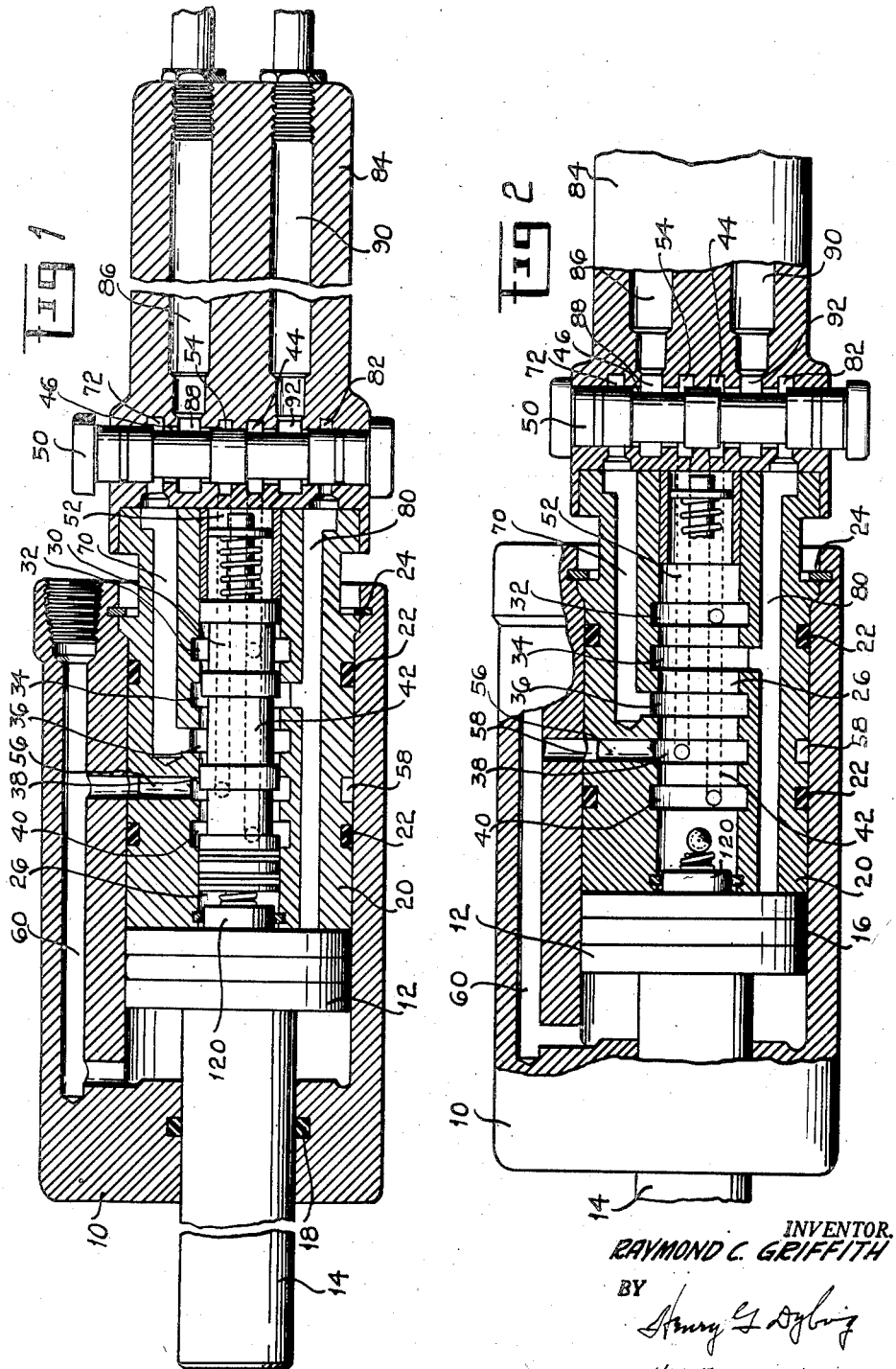

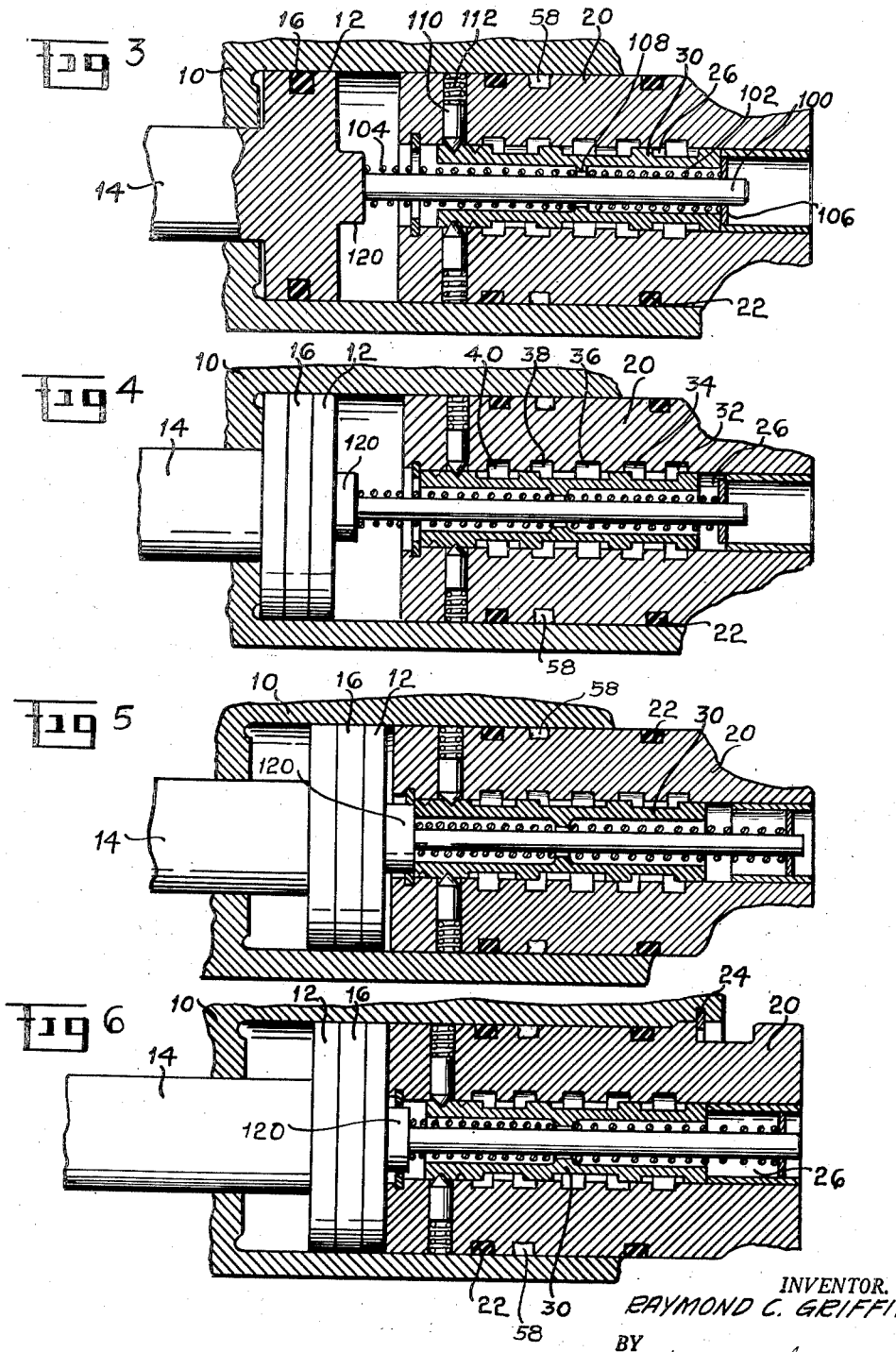

2,784,700

RECIPROCALLY DRIVEN HYDRAULIC DEVICE WITH MANUALLY ACTUATED SHUT-OFF VALVE PROVIDING FLUID BY-PASS

Raymond C. Griffith, Detroit, Mich.

Application March 19, 1953, Serial No. 343,303

8 Claims. (Cl. 121—3)

This invention relates to a hydraulic double acting cylinder with a self-contained valve mechanism that causes the cylinder to reciprocate automatically when in the "on" position and causes the piston to come to rest at the end of a stroke when in the "off" position and at the same time by-passes fluid when in the "off" position.

In the past, difficulty has been encountered when attempting to use a piston that is mounted for reciprocatory movement to actuate the valve reversing the direction of movement of the piston. Numerous attempts have been made to accomplish this result, usually resulting in a condition where the piston comes to rest at dead center, that is, in a position when fluid is admitted to both sides of the piston.

An object of this invention is to provide a piston and a valve mechanism so arranged that when the piston approaches the end of its stroke, the valve mechanism snaps from one position to another, altering the flow of fluid to the cylinder, thereby reversing the direction of movement of the piston. This has been accomplished by means of a releasable detent holding the valve member in a predetermined position until sufficient force is exerted upon the valve member to cause the detent to release the valve member, thereby permitting reversal of the flow of fluid to the cylinder. A pair of springs are used, controlled by the movement of the piston, one spring being compressed when the piston moves in one direction, exerting a force upon the valve member tending to reverse the position of the valve member, the force exerted by this spring gradually increasing until a time when the piston approaches the end of the stroke, when the piston positively releases the detent, permitting the valve to be actuated by the spring into another position, reversing the flow of fluid to the cylinder, thereby reversing the direction of the piston. As the piston travels in the reverse direction, the other spring is compressed by the piston, exerting a force upon the valve member in the opposite direction. However, the valve member is restrained from movement by the detent, again holding the valve member in position until the detent is released. This takes place near the end of the stroke of the piston in the reverse direction.

Another object of this invention is to provide a valve for turning the hydraulic motor on and off. When in the "off" position, the arrangement of the "on" and "off" valve member is such as to permit the piston to move to the end of a stroke.

Another object of this invention is to provide a valve mechanism having an "on" position and an "off" position, such that when in the "off" position the valve mechanism provides a by-pass for the fluid.

Another object of this invention is to provide a hydraulic motor wherein a valve mechanism is provided that may be referred to as a "load and fire" valve mechanism, in that during the operative stroke of the piston of the motor in either direction a spring mechanism is energized urging the reversing valve mechanism in one direction or the other, depending upon the direction of movement of the piston, the energized spring mechanism, however, being insufficient to actuate the reversing valve mechanism until the valve mechanism is positively released by the piston approaching the end of a stroke. This motor may be used for various purposes similar to an air hammer, as for example, the driving of lock bolts such as the lock bolts now appearing in the trade.

Other objects and advantages reside in the construction of parts, the combination thereof and the mode of operation, as will become more apparent from the following description.

Referring to the drawings,

Figure 1 is a longitudinal cross sectional view, showing the valve for turning the motor on and off in the "on" position.

Figure 2 is another cross sectional view similar to Figure 1, showing the valve for turning the motor on and off in the "off" position, providing a return passage for the fluid. In this figure the reversing valve has been removed, showing the arrangement of the fluid passages.

Figure 3 discloses the piston moving towards the left, as viewed in Figure 3, approaching one end of its stroke immediately prior to the movement of the valve being actuated to reverse the direction of the piston.

Figure 4 discloses a piston after it is removed to the extreme end of its stroke immediately after the valve mechanism has reversed the flow of fluid to the cylinder, causing the pistons to travel in the reverse direction.

Figure 5 discloses a piston moving towards the right, as viewed in Figure 5, approaching the end of its stroke in the reverse direction, immediately prior to the valve reversing the flow of fluid to the cylinder.

Figure 6 discloses a piston at the end of its stroke in the reverse direction, immediately after the valve has been actuated to again reverse the flow of fluid to the cylinder, thereby causing the piston to move towards the left, as viewed in Figure 6.

In the drawings, the reference character 10 indicates a cylinder having mounted therein a piston 12 connected to a piston rod 14 used for delivering power. A suitable piston ring or sealing ring 16 is mounted in the periphery of the piston, so as to provide a proper seal between the piston and the cylinder wall. One end of the cylinder is provided with a bore for the piston rod 14 and supports a packing ring or packing gasket 18, as best seen in Figure 1. The other end of the cylinder supports a valve housing 20, forming a main body for the reversing valve mechanism. A plurality of packing rings or gaskets 22 are used to seal this main body to the walls of the cylinder. The main body is held in position by a releasable retaining washer 24. This main body 20 of the valve is provided with a cylindrical cavity 26, having mounted therein a valve member 30.

As may best be seen by referring to Figure 2, the cylindrical cavity 26 in the main body member 20 is provided with a plurality of annular grooves 32, 34, 36, 38 and 40. The grooves 32 and 40 are connected to a passage or conduit 42 communicating with a groove 44 in a transversely disposed cylindrical cavity 46 in the handle member 84, the cavity 46 being provided with a valve core 50 that has an "on" and "off" position, as will be described more fully later. The groove 38 is connected to a passage 52 terminating in an annular groove 54 in the periphery of the cylindrical cavity 46. The groove 38 also communicates with a passage 56 in the main body member 20, terminating in an annular groove 58 in the periphery of member 20, the groove 58, in turn, being connected to a passage 60 in the wall of the cylindrical main body member 10 and leading to one end of the cylindrical cavity in member 10.

The annular groove 36 communicates with a passage or conduit 70 terminating in an annular groove 72 in the periphery of the cylindrical cavity 46. The groove 34 is connected to a passage or conduit 80, one end of which terminates in the cylindrical cavity in member 10 and the other end of which terminates in the annular groove 82 in the periphery of the cylindrical cavity 46.

Handle member 84, which contains the cylindrical cavity 46, is provided with an intake or pressure passage 86 and a return passage or conduit 90. The intake passage or conduit 86 terminates in a large annular groove 88 in the periphery of the cylindrical cavity 46 and the return passage 90 is also connected to a large annular groove 92 in the periphery of the cylindrical cavity 46. The operation of the reciprocating piston 12 will first be described in connection with the valve member 50 in the operative position, as shown in Figure 1.

Figure 1 is for the purpose of showing the passages with the valve core 50 in place, shown in the "on" position. In Figure 2 the valve core 50 is shown in the "off" position. Operating valve 30 has been omitted from Figure 2, so that all internal passages can be clearly shown. The pressure conduit 86 and return conduit 90 in the handle member 84, as shown, are connected with grooves 88 and 92 respectively. The operation of the device with the valve 50 in one position will now be described.

With valve 50 in the "on" position, the groove 88 is connected with groove 72 through the undercut in valve 50. The groove 72 in the periphery of the cylindrical cavity 46 in turn connects with passage 70 in the main body member 20, terminating in the groove 36. Also, groove 92 connects with groove 44 through the undercut in valve 50. This groove 44 connects with passage 42, which connects with the grooves 32 and 40 around operating valve 30. Grooves 54 and 82 are blocked by the lands on valve 50. Groove 40 connects through the undercut in valve 30 to groove 38 around operating valve 30 and also to passages 56, groove 58 and passage 60 to the rod end of the cylinder 10. Groove 92, when the valve 50 is in the "off" position shown in Figure 2, connects through the undercut in valve 50 to the groove 82 and through the passage 80 to the head of the cylinder.

The operation of the reciprocatory movement of the piston 12 will now be described. By referring to Figure 3, the piston 12 has been shown as it approaches one end of the cylinder, that is, the extreme left position, as shown in Figure 3. Hydraulic fluid is supplied under pressure through the conduit 86 to the groove 88, the undercut of valve 50 to the groove 72, then through the passage 70 to the groove 36. From the groove 36, fluid flows through the undercut in the valve core 30 to the groove 34, thence through the passage 80 to the right of the piston 12. The piston has probably 1/32" travel to the left before coming to the extreme end of the cylindrical cavity. It is to be noted that a rod 100 attached to the piston 12 supports a pair of springs 102 and 104. The spring 102 is now in compression, in that one end abuts the trigger washer 106 fixedly secured upon the rod 100, and the other end abuts an annular shoulder 108 in the interior surface of valve member 30. The spring 104 is positioned between a boss on the end of the piston 12 and the annular shoulder 108.

When the piston is in the position shown in Figure 3, the spring 102 is in compression and exerts a pressure against the annular shoulder 108; but the pressure exerted by the spring 102 is not sufficient to release the pawls 110, spring urged by compression springs 112, into a cylindrical or peripheral groove near the end of the valve core 30. It is to be noted, however, that the washer 106 now abuts the end of the valve core 30, so that as the piston 12 travels to the left to the end of the stroke, as viewed in Figure 3, the valve core 30 is positively driven to the left, thereby forcing the pawls 110 out of the groove in which they are seated, and as soon as the pawls 110 have been unseated, the spring 102, so to speak, fires or snaps the valve core 30 from the position shown in Figure 3 into the position shown in Figure 4. This action has been accomplished by what might be referred to as a "load and fire action." As the piston travels from one end of its stroke to the other end of its stroke, one of the compression springs 102 or 104, depending upon the direction of movement of the piston 12, is gradually compressed or loaded. However, the force exerted by the other one of these springs is insufficient to unseat the pawls from the grooves. In other words, the pawls 110 will continue to hold the valve core 30 in a fixed position until the valve core is positively driven, either to the left, as viewed in Figure 3, or to the right, as viewed in Figure 5, which will be explained more fully later.

When the valve core 30 snaps from the position shown in Figure 3 to the position shown in Figure 4, the flow of fluid to the cylinder is reversed. When the piston travels from the right to the left, as shown in Figure 3, fluid is supplied from the source of pressure to the conduit 86 through the groove 88 through the undercut portion of the valve member 50 to the groove 72, which communicates with the passage 70 supplying fluid to the groove 36, the fluid flowing from the groove 36 through the undercut portion of the valve core member 30 to the groove 34, then through the passage 80 to the cylindrical cavity to the right of the piston 12. When the valve core 30 is driven in the position shown in Figure 4, the fluid under pressure is supplied through the conduit 70 to the groove 36, then through the undercut portion of the valve 30 to the groove 38, communicating with a passage 56 with the conduit 60 supplying fluid under pressure to the left of the piston 12, driving the piston towards the right, as viewed in Figures 4, 5 and 6. During the stroke of the piston 12 from left to right, the compression spring 104 is compressed; but the spring 104 has insufficient energy stored up in it to release the pawls or detents 110 from the peripheral groove in the valve core 30.

As may best be seen in Figure 5, the boss 120 engages the left hand end of the valve core member 20, as viewed in Figure 5, unseating the pawls 110 from the groove and as soon as the pawls 110 are unseated, the spring 104 snaps or fires the valve core 30 from the position shown in Figure 5 to the position shown in Figure 6. The fluid is again reversed, so that when the valve core 30 is in the position shown in Figure 6, the passages are the same as described in connection with Figure 3, so as to supply fluid under pressure to the right of the piston 12, thereby actuating the piston to the left from the position shown in Figure 6 to the position shown in Figure 3. These operations continue in seriatim and cyclically as long as the valve core 50 is in the position shown in Figure 1 and as long as fluid is supplied under pressure through the intake conduit 86.

When the valve core 50 is actuated from the "on" position shown in Figure 1 to the "off" position shown in Figure 2, the piston 12 proceeds to one end of its stroke and remains stationary in this position, thereby interrupting the operation of the hydraulic motor.

The passages shown in connection with the valve in the "off" position will now be described, when the valve member 30 is in the position shown in Figures 1 and 6. In the first place, the land on the valve core 50, that is, the cylindrical surface snugly fitting the cylindrical cavity 46, obstructs or shuts off the flow of hydraulic fluid from the groove 88 to the groove 72 and thereby interrupts the flow of fluid through the passage 70. However, fluid does flow from the groove 88 around the undercut to the groove 54. The groove 54 is connected by the conduit or passage 52 to the groove 38 supplying fluid through the passage 60 to the left of the piston 12. Irrespective of the position of the valve core 30, the valve core will eventually be actuated into the other position. The fluid is returned from the cylindrical cavity to the right of the piston 12 through conduit 80 to the groove 82. From the groove 82 the fluid flows through the undercut in valve 50 to the return passage 90. The groove 38, supplied with fluid under pressure through conduit 52, is connected through the undercut of the valve core member 30 to the groove 40, which is connected by a conduit 42 to the groove 44, permitting the fluid to return and continue to circulate through the return passage 90. It is to be noted, however, that the land in the center of the valve core 50 restricts the passage of fluid from the passage 42 and the groove 44 and the groove 92. By this arrangement, sufficient pressure is supplied from the groove 38 through the passage 60 to the left of the piston 12, so as to actuate the piston to the extreme right, as shown in Figures 2 and 6. This is important to prevent the pump from operating at high pressure with subsequent heavy power loss and heating of fluid or oil when in the "off" position.

When valve member 30 is in the position shown in Figures 4 and 5, the passages are so arranged as to actuate the piston to the inner end of the cylindrical cavity, where it remains until the valve 50 is actuated from the "off" position shown in Figure 2, to the "on" position shown in Figure 1, when the motor again reciprocates, as described above.

If valve 30 is in the position shown in Figure 3 and the piston 12 is moving to the left when the valve 50 is moved to the "off" position, the piston 12 will immediately reverse and return to the position shown in Figure 6, where it stops. If the valve 30 is in the position shown in Figures 4 and 5 and the piston 12 is moving to the right, as viewed in Figures 4 and 5 when the valve 50 is moved to the "off" position, the piston 12 will continue to move to the right and come to rest in the position shown in Figure 6.

In the event it is desirable to have the piston 12 come to rest in the opposite end of the cylinder, namely, the position shown in Figure 4, it is merely necessary to reverse the connections of the passages 52 and 80, so as to connect the passage 52 to the groove 82 and the passage 80 to the groove 54.

In the description of the operation of the piston 16, the fluid passage supplying the fluid under pressure to the cylinder by means of the position of the valve 30 has been described. Obviously, the valve lets the fluid out of the opposite end of the cylinder, as in the standard way directional valve action, as is well known to those skilled in the art.

Although the preferred embodiment of the device has been described, it will be understood that within the purview of this invention, various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a fluid actuated device for driving lock bolts and similar fasteners, a body defining an elongated bore, a piston reciprocally mounted in one end portion of said bore, a valve housing fixed to said body in the opposite end portion of said bore and having fluid inlet and outlet passageways therein, means for driving said piston successively in opposite directions including a first valve carried by said valve housing and operable in selected positions to successively permit fluid to flow from said inlet passageway to said bore on opposite ends of said piston, resilient means actuable in response to the movement of said piston to shift said first valve between said selected positions, a second valve carried by said valve housing and operable to establish fluid circuits permitting a portion of the fluid flowing through said inlet passageway to flow to said bore on one end of said piston to force said piston to a fully retracted position and to hold same in said fully retracted position and permitting the remaining portion of the fluid flowing through said inlet passageway to bypass said bore in flowing to said outlet passageway, and a restriction in said bypass fluid circuit whereby to provide back pressure therein to always provide a pressure to retract and hold said piston in said fully retracted position.

2. A fluid actuated device for driving lock bolts and similar fasteners, comprising a body defining an elongated bore, a piston reciprocally mounted in one end portion of said bore, a valve housing fixed to said body in the opposite end portion of said bore and having fluid inlet and outlet passageways, fluid circuit means connecting said passageways with said bore, a first valve carried by said housing and operable to successively permit fluid to flow from said inlet passageway to said bore on opposite ends of said piston to drive said piston in opposite directions and to successively permit fluid to flow from said bore on opposite ends of said piston to said outlet passageway, resilient means actuable in response to the movement of said piston to shift said first valve between selected positions, and a second valve controlling flow of fluid to said first valve and shiftable in one selected position to flow said fluid for effecting normal reciprocal operation of said piston and into a second selected position to establish a fluid circuit permitting a portion of the fluid flowing through said inlet passageway to flow to said bore on one end only of said piston to drive said piston to a predetermined retracted position and to permit the remaining portion of fluid flowing through said inlet passageway to bypass said bore in flowing to said outlet passageway, said second valve having a fluid exhaust passageway provided with a restriction and operable only when said second valve is shifted to said second selected position aforesaid.

3. In a fluid actuated device for driving lock bolts and similar fasteners, the combination including a body structure provided with a bore, piston means reciprocally mounted in said bore, a source of fluid pressure, a valve housing structure carried by said body structure and provided with first and second cooperating fluid inlet and outlet passages connected with said source of fluid pressure, means including a first valve automatically operable to be alternately fixed in a first and second position whereby to establish fluid circuits alternately connecting said first fluid inlet and outlet passages to said bore on opposite ends of said piston means to drive same in opposite directions, and means including a second valve operable to establish fluid circuits connecting said second fluid inlet and outlet passages with said source of fluid pressure and with said first valve in both its first and second position with said bore at one end only of said piston means to hold said piston in a selected position.

4. In a fluid actuated device for driving lock bolts and similar fasteners, the combination including a body structure provided with a bore, piston means reciprocally mounted in said bore, a source of fluid pressure, a valve housing structure carried by said body structure and provided with first and second cooperating fluid inlet and outlet passages connected with said source of fluid pressure, means including a first valve automatically operable to be alternately fixed in a first and second position whereby to establish fluid circuits alternately connecting said first fluid inlet and outlet passages to said bore on opposite ends of said piston means to drive same in opposite directions, and means including a second valve operable to establish fluid circuits connecting said second fluid inlet and outlet passages with said source of fluid pressure and with said first valve in both its first and second position with said bore at one end only of said piston means to hold said piston in a selected position, said valve housing structure having a bore provided with annular grooves and reciprocally supporting said first valve, said first valve having annular grooves coacting with the grooves in the bore of the valve housing structure, said first and second inlet and outlet passages connected with different grooves carried by the bore of said valve housing structure.

5. In a fluid actuated device for driving lock bolts and similar fasteners, the combination including a body structure provided with a bore, piston means reciprocally mounted in said bore, a source of fluid pressure, a valve housing structure carried by said body structure and provided with first and second cooperating fluid inlet and outlet passages connected with said source of fluid pressure, means including a first valve automatically operable to be alternately fixed in a first and second position whereby to establish fluid circuits alternately connecting said first fluid inlet and outlet passages to said bore on opposite ends of said piston means to drive same in opposite directions, and means including a second valve operable to establish fluid circuits connecting said second fluid inlet and outlet passages with said source of fluid pressure and with said first valve in both its first and second position with said bore at one end only of said piston means to hold said piston in a selected position, said second valve mounted in said valve housing structure and selectively moved into an "on" and "off" position to respectively connect said first and second inlet and outlet passages with said source of fluid pressure.

6. In a fluid actuated device for driving lock bolts and similar fasteners, the combination including a body structure provided with a bore, piston means reciprocally mounted in said bore, a source of fluid pressure, a valve housing structure carried by said body structure and provided with first and second cooperating fluid inlet and outlet passages connected with said source of fluid pressure, means including a first valve automatically operable to be alternately fixed in a first and second position whereby to establish fluid circuits alternately connecting said first fluid inlet and outlet passages to said bore on opposite ends of said piston means to drive same in opposite directions, and means including a second valve operable to establish fluid circuits connecting said second fluid inlet and outlet passages with said source of fluid pressure and with said first valve in both its first and second position with said bore at one end only of said piston means to hold said piston in a selected position, said second valve mounted in said valve housing structure and selectively moved into an "on" and "off" position to respectively connect said first and second inlet and outlet passages with said source of fluid pressure, said second valve provided with means operable when in "off" position to establish a restriction in the outlet passage whereby to create a back pressure in the fluid inlet passage for applying a residual pressure in the bore for holding the piston in the selected position aforesaid.

7. In a fluid actuated device for driving lock bolts and similar fasteners, the combination including a body structure provided with a bore, piston means reciprocally mounted in said bore, a source of fluid pressure, a valve housing structure carried by said body structure and provided with first and second cooperating fluid inlet and outlet passages connected with said source of fluid pressure, means including a first valve automatically operable to be alternately fixed in a first and second position whereby to establish fluid circuits alternately connecting said first fluid inlet and outlet passages to said bore on opposite ends of said piston means to drive same in opposite directions, and means including a second valve operable to establish fluid circuits connecting said second fluid inlet and outlet passages with said source of fluid pressure and with said first valve in both its first and second position with said bore at one end only of said piston means to hold said piston in a selected position, said second valve mounted in said valve housing structure and selectively moved into an "on" and "off" position to respectively connect said first and second inlet and outlet passages with said source of fluid pressure, said second valve provided with means operable when in "off" position to establish a restriction in the outlet passage whereby to create a back pressure in the fluid inlet passage for applying a residual pressure in the bore for holding the piston in the selected position aforesaid, said valve housing structure having a second bore provided with annular longitudinally spaced grooves and lands, said second valve longitudinally slidably supported in the second bore of said valve housing structure and having a plurality of longitudinally spaced annular grooves and lands coacting with the grooves and lands in said second bore, said second valve selectively moved to the "on" and "off" positions aforesaid to respectively open said first inlet and outlet passages to fluid pressure and cut-off said second inlet and outlet passages and to open said second inlet and outlet passages while cutting off said first inlet and outlet passages.

8. In a fluid actuated device for driving lock bolts and similar fasteners, the combination including a body structure provided with a bore, piston means reciprocally mounted in said bore, a source of fluid pressure, a valve housing structure carried by said body structure and provided with first and second cooperating fluid inlet and outlet passages connected with said source of fluid pressure, means including a first valve automatically operable to be alternately fixed in a first and second position whereby to establish fluid circuits alternately connecting said first fluid inlet and outlet passages to said bore on opposite ends of said piston means to drive same in opposite directions, and means including a second valve operable to establish fluid circuits connecting said second fluid inlet and outlet passages with said source of fluid pressure and with said first valve in both its first and second position with said bore at one end only of said piston means to hold said piston in a selected position, said second valve mounted in said valve housing structure and selectively moved into an "on" and "off" position to respectively connect said first and second inlet and outlet passages with said source of fluid pressure, said second valve provided with means operable when in "off" position to establish a restriction in the outlet passage whereby to create a back pressure in the fluid inlet passage for applying a residual pressure in the bore for holding the piston in the selected position aforesaid, and valve housing structure having a second bore provided with annular longitudinally spaced grooves and lands, said second valve longitudinally slidably supported in the second bore of said valve housing structure and having a plurality of longitudinally spaced annular grooves and lands coacting with the grooves and lands in said second bore, said second valve selectively moved to the "on" and "off" positions aforesaid to respectively open said first inlet and outlet passages to fluid pressure and cut-off said second inlet and outlet passages and to open said second inlet and outlet passages while cutting off said first inlet and outlet passages, said means for establishing a restriction in the outlet passage comprising a land and groove construction on said second valve located to restrict fluid flow from the groove in the second bore aforesaid to the groove in said second valve open to the main fluid outlet passage.

References Cited in the file of this patent

UNITED STATES PATENTS

| | | |
|---|---|---|
| 375,200 | Ross | Dec. 20, 1887 |
| 1,965,038 | Hartman | July 3, 1934 |
| 2,246,535 | Playfair | June 24, 1941 |
| 2,404,747 | Sacchini | July 23, 1946 |
| 2,443,568 | Palm | June 15, 1948 |
| 2,450,564 | Sacchini | Oct. 5, 1948 |
| 2,555,018 | Von Seggern | May 29, 1951 |
| 2,703,557 | Polki | Mar. 8, 1955 |
| 2,722,200 | Horton | Nov. 1, 1955 |

FOREIGN PATENTS

| | | |
|---|---|---|
| 63,691 | Sweden | Sept. 13, 1927 |